Patented Jan. 24, 1928.

UNITED STATES PATENT OFFICE.

PERCIVAL JOHN FRYER, OF KENT, ENGLAND, ASSIGNOR TO CATALPO LIMITED, OF LONDON, ENGLAND, A BRITISH LIMITED LIABILITY COMPANY.

PROCESS OF HYDROLYSIS, PARTICULARLY THE SPLITTING OF OILS AND FATS.

No Drawing. Application filed April 9, 1921, Serial No. 460,039, and in Great Britain April 24, 1920.

This invention is for improvements in and relating to processes of hydrolysis and saponification and has particular reference to the hydrolysis of glycerides such as oils and fats.

According to this invention, a process of hydrolysis or saponification, for example, the hydrolysis of an oil or fat, is characterized by effecting the reaction in the presence of clay in a state of fine subdivision.

Advantageously, a clay of high purity is employed. Such clay, which for convenience will be hereafter referred to as "colloidal clay", may be obtained from any suitable natural clay by washing and sedimentation, or other process which is adapted to yield a pure product and enhance the colloidal nature of the original substance, and, preferably, the clay used is one which has been prepared by aid of peptization. For example, a clay which has been submitted to the treatment described in Feldenheimer's British specification No. 106,890, or United States Patent No. 1,324,958 of December 16, 1919, may with advantage be utilized.

By peptization is meant the dispersion of the clay in a fluid medium by addition of an appropriate quantity of a deflocculating reagent, for example, ammonia, sodium hydrate, or sodium carbonate. The clay substance is then recovered from its suspension in any known way.

The hydrolysis may be carried out under any appropriate conditions of temperature and pressure, and by aid of the usual hydrolyzing accelerating agents, such as bases, alkalis (for example, lime, sodium and potassiumhydroxide, sulpho-aromatic or sulpho-fatty compounds (for example, Twitchell's reagent) litholytic ferments (of which the ferment of castor-oil seeds is a notable example), or other reagents as may be desired. The proportion of clay utilized may be varied according to circumstances as, for instance, the nature of the substance under treatment and the particular composition of the reaction mixture.

One form of clay suitable for carrying the present invention into effect is, as already stated, obtained by the process described in British specification No. 106,890 or United States Patent No. 1,324,958. For instance, the following procedure may be followed.

A high-class china clay, such as Fraddon clay, is washed by passing it over "mica-drags" in the usual manner, but instead of water only, a solution of 1.2 parts by weight of sodium carbonate (calculated as anhydrous salt) in 2000 parts by weight of water is utilized for 100 parts, or 5 per cent clay suspension. A larger quantity of "mica" is deposited upon the drags than is so removed when water alone is employed. The clay dispersion passes to a settling-tank in which it is left to stand for further deposition of mica, and thence is led to a second tank where the clay is precipitated by appropriate addition of a precipitant, for example, a weak solution of alum.

The peptizing agent, i. e. the sodium carbonate, may obviously also be added at any other desired stage before leading the suspension over the drags.

Alternatively, the peptizing agent may be added prior to entry of the suspension into the settling-tank after the customary treatment on the mica-drags, the liquid being allowed to stand in this tank for a sufficient period of time, and the clay dispersion being then run into the tank where the flocculating reagent is added.

In place of sodium carbonate, other peptizing agents may be employed, such, for example, as ammonia.

There results from this treatment a very highly purified and finely divided clay, and the following are examples of the use of this particular clay for carrying the present invention into effect, it being understood that these examples are given for illustrative purposes and not by way of limitation.

*Example I.*

45 lbs. of the colloidal clay and 450 lbs. of zinc oxide are worked up into a thin paste with about 15 cwt. of water in an agitator, and the paste is transferred to an autoclave containing 3 tons of cottonseed oil. Steam under pressure, which need not exceed 90 lbs. per sq. inch, is then introduced and the materials are heated together under pressure for upwards of about 8 hours. 95 per cent of the oil is thereby resolved into glycerine and fatty acids, together with a certain proportion of zinc soap corresponding to the quantity of zinc oxide used.

It appeared that the addition of the colloidal clay expedited the process as well as effecting a high degree of hydrolysis with a consequent superior yield of glycerine, while the fatty acids were of good colour and of a nature for application without further purification to a number of industrial purposes, such, for example, as soap manufacture.

*Example II.*

Known weights of the following oils were heated at about 100° C. for the following periods with a given volume of a standard solution of caustic soda in excess. The same oils were similarly treated for the same period of time and under identical conditions in presence of the colloidal clay. The degree of saponification in each case was then determined by titration of the excess of alkali. The following results were obtained:

| Time (hrs. mins.). | Per cent clay (on oil). | Per cent oil (saponified). |
|---|---|---|
| | Olive oil. | |
| 1.15 | 0.0 | 22.6 |
| 1.15 | 9.0 | 53.2 |
| 1.15 | 0.0 | 21.0 |
| 1.15 | 18.0 | 52.0 |
| | Linseed oil. | |
| 1.0 | 0.0 | 39.6 |
| 1.0 | 24.0 | 97.3 |
| | Cotton seed oil. | |
| 1.0 | 0.0 | 6.7 |
| 1.0 | 11.0 | 58.8 |
| 1.30 | 0.0 | 9.9 |
| 1.30 | 11.0 | 87.0 |
| 2.0 | 0.0 | 12.8 |
| 2.0 | 11.0 | 97.4 |

When desired, at the conclusion of the process, the clay may be removed by settlement or filtration or in any other suitable way, but in the case of saponification of an oil or fat by means of alkalis it will frequently be found advantageous to retain the clay in the finished soap since the properties of the latter are thereby improved.

What I claim as my invention and desire to secure by Letters Patent is:—

1. A process of hydrolysis of liquid glycerides of fatty acids wherein the hydrolytic reaction is effected by heating under pressure in the presence of clay which has been prepared by aid of peptization.

2. A process of hydrolysis of liquid glycerides of fatty acids wherein the hydrolytic reaction is effected by heating under pressure in the presence of clay which has been prepared by aid of peptization with an alkaline clay-peptizing agent.

3. A process of hydrolysis of liquid glycerides of fatty acids wherein the hydrolytic reaction is effected by heating under pressure with a hydrolysis accelerator in the presence of clay which has been prepared by aid of peptization.

4. A process of hydrolysis of liquid glycerides of fatty acids wherein the hydrolytic reaction is effected by heating under pressure with a hydrolysis accelerator in the presence of clay which has been prepared by aid of peptization with an alkaline clay-peptizing agent.

5. A process of hydrolysis of liquid glycerides of fatty acids wherein the hydrolytic reaction is effected by heating under pressure with an alkaline hydrolysis accelerator in the presence of clay which has been prepared by aid of peptization.

6. A process of hydrolysis of liquid glycerides of fatty acids wherein the hydrolytic reaction is effected by heating under pressure with an alkaline hydrolysis accelerator in the presence of clay which has been prepared by aid of peptization with an alkaline clay-peptizing agent.

In testimony whereof I affix my signature.

PERCIVAL JOHN FRYER.